J. TESSIER.
CAMERA BACK.
APPLICATION FILED MAY 3, 1920.
1,398,950.
Patented Nov. 29, 1921.
2 SHEETS—SHEET 1.
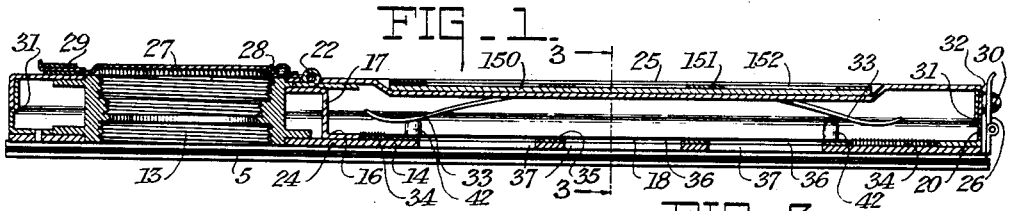
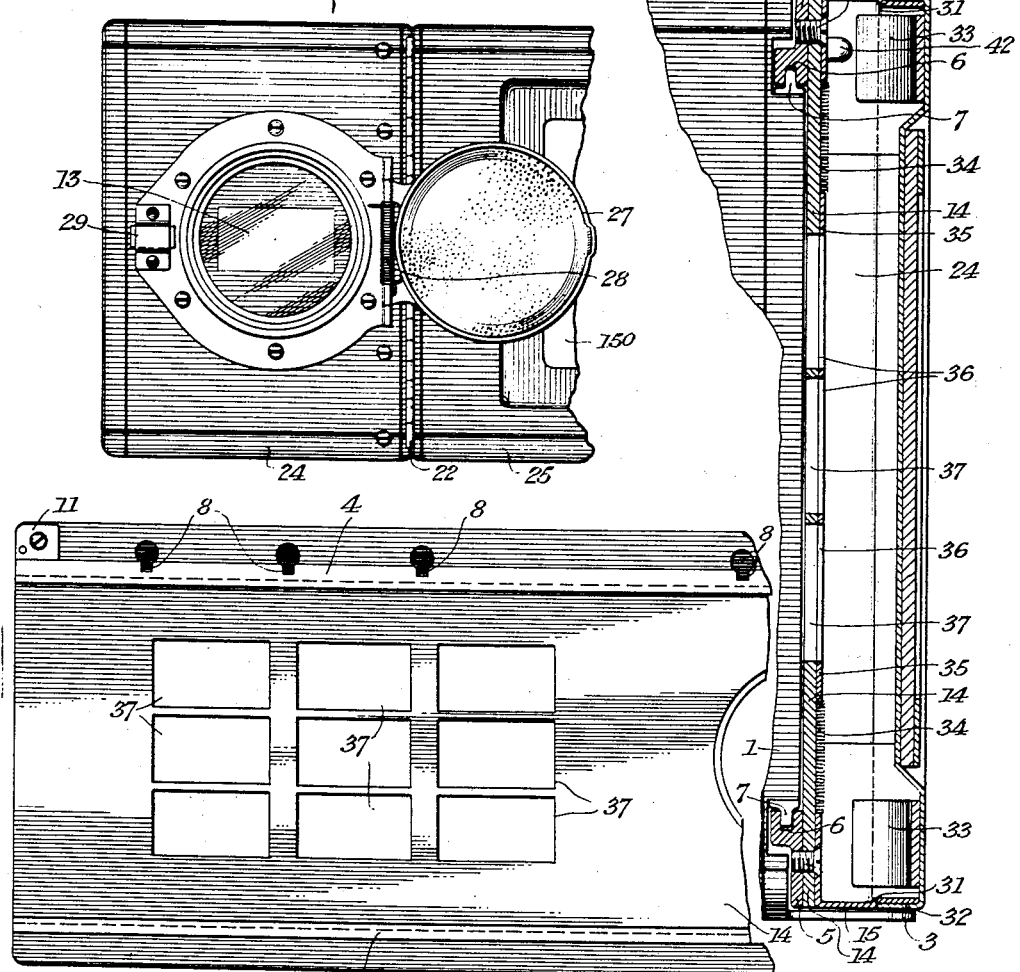
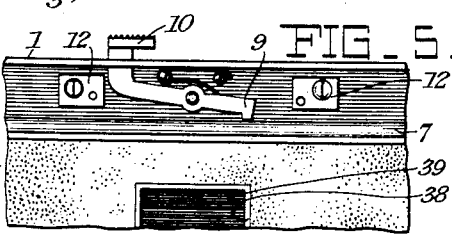
WITNESSES:
INVENTOR
Julien Tessier,
BY
ATTORNEYS J. TESSIER.
CAMERA BACK.
APPLICATION FILED MAY 3, 1920.
1,398,950.
Patented Nov. 29, 1921.
2 SHEETS—SHEET 2.
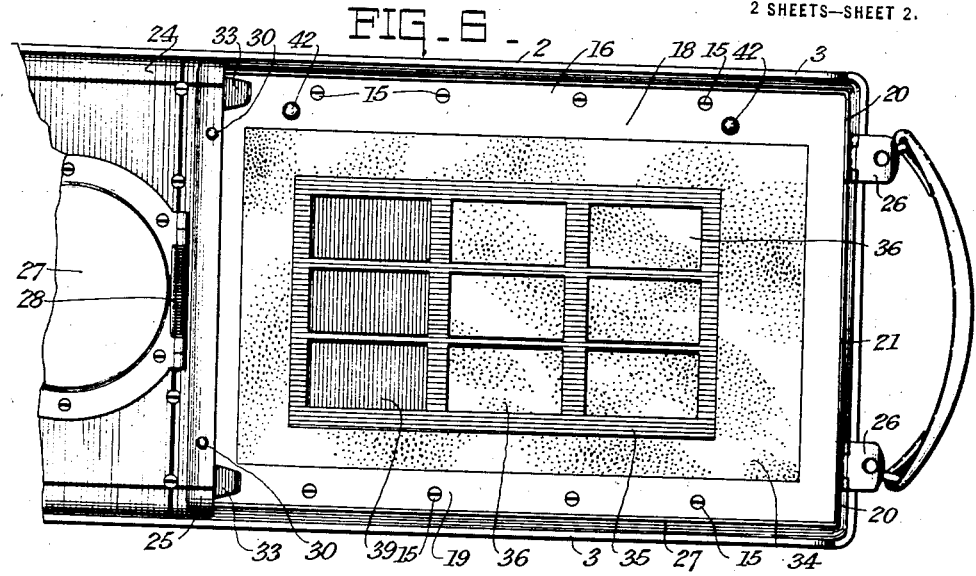
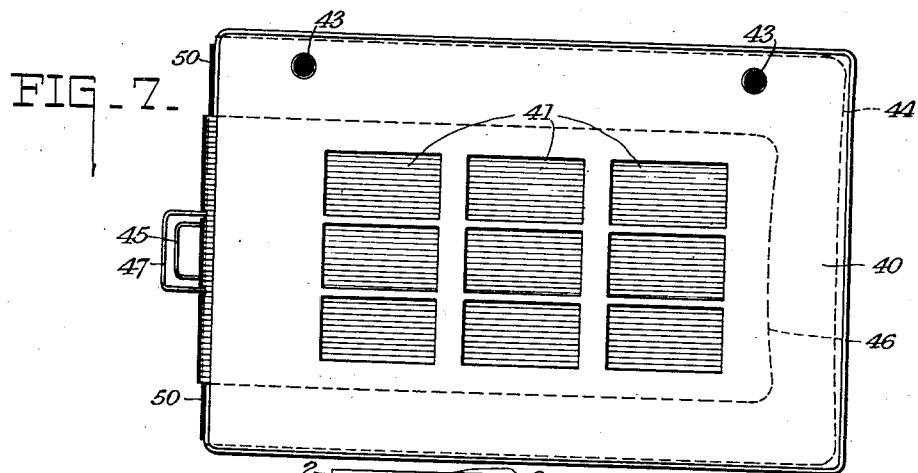
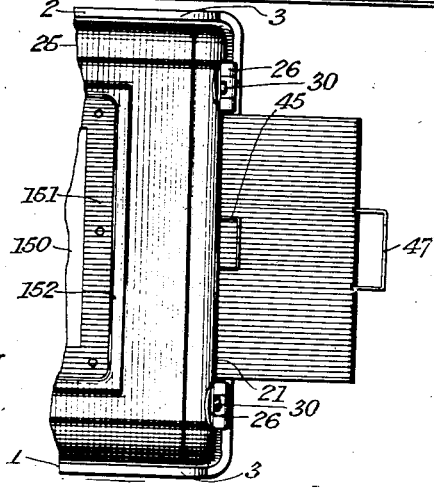
WITNESSES:
INVENTOR
Julien Tessier
BY
ATTORNEYS

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

CAMERA-BACK.

1,398,950.      Specification of Letters Patent.      Patented Nov. 29, 1921.

Application filed May 3, 1920. Serial No. 378,612.

*To all whom it may concern:*

Be it known that I, JULIEN TESSIER, citizen of the Republic of France, residing at Rochester, in the county of Monroe and State of New York, have invented certain new and useful Improvements in Camera-Backs, of which the following is a full, clear, and exact specification.

This invention relates to a back for a camera, and particularly to a back which is so designed that a plate holder which is intended for use with it will be correctly positioned therein.

This camera back is designed for and is particularly intended for use as a part of a camera in which three simultaneous color records may be made, and fully shown and described in my companion application Serial No. 378,611, filed May 3, 1920; and for use in the camera back and coöperating therewith I have designed a plate holder to which my companion application Serial No. 378,613, filed May 3, 1920, is directed.

The object of this invention is to provide a camera back into which the plate holder may be inserted directly from the back, the plate holder and the camera back having coöperating registering means, so that the holder can be seated in the back and the closure for the back latched only when these means are in proper registry, thus insuring that the specially designed exposure openings of both parts are accurately in registry and the holder properly positioned, these elements having, moreover, coöperating means insuring that of a plurality of slides on the holder only that one can be withdrawn that will result in proper exposure of the plate. Other objects will appear hereinafter. To these and other ends my invention resides in the combinations and improvements hereinafter described and claimed.

Reference will now be made to the appended drawings in which the same reference characters refer to the same parts throughout.

Figure 1 is a section of the back removed from the camera;

Fig. 2 is a rear elevation of a portion of the back;

Fig. 3 is a section of the back on line 3—3 of Fig. 1, showing also a fragment of the camera casing;

Fig. 4 is an elevation of the front of the back removed from the camera, one end being broken off;

Fig. 5 is a detail showing a catch on the camera casing;

Fig. 6 is a rear elevation of the back on the camera with the door open, one end being broken off;

Fig. 7 is a front elevation of the plate holder designed for use with the back;

Fig. 8 is a fragmentary elevation of one end of the back with a plate holder in position and a slide partially withdrawn.

The camera 1, which is fully described in my companion application, No. 378,611, has a slidable back 24. The upper wall 2 of the camera casing overhangs the back, and the bottom is likewise extended to form a flange 3, and between these parts 24 is positioned. On the front of the back are longitudinal bars 4 and 5 with facing grooves 6 which engage ways 7 on the body of the camera. On the upper side of the upper bar 4 is a series of four slots 8, which are engageable by a pivoted spring pressed latch 9 carried on the camera casing, and determine four positions of the back. One end of the latch extends above the camera and constitutes a finger piece 10. At each end of bar 4 is an abutment 11, one only of which is shown in Fig. 4, and these engage abutments 12 on the camera casing preventing the removal of the back in ordinary use.

At one end of the back is a focusing window 13 with a hinged door 27, normally spring pressed open by spring 28, and held closed against such action by latch 29. The main front plate of the back is designated 14 and to this is secured by screws 15, which also engage bars 4 and 5, a narrow frame 16 of sheet metal. The plate 14 extends over the entire back while the frame 16 is bent up to form an inner end flange 17, upper and lower flanges 18 and 19, and abutments 20 at the outer end, constituting a compartment or seat for the plate holder. The abutments 20 extend a short distance only across the end, leaving a central space 21 therebetween. Upon the back is hinged at 22, a door 25, held in closed position by latches 26 which engage pins 30. The flanges 18 and 19 and abutments 20 are inset at their upper ends as indicated at 31 to provide a seat for the flanges 32 which are carried on the edges of door 22. The door has a recess or seat 152 on its back in which a strip of celluloid 150 is held in place by an apertured frame 151, thus furnishing panels or tablets upon which erasable notes may be made. On the inner surface of the back, pressure springs 33 are carried for pressing an inserted plate holder in contact with the front of the compartment.

Within frame 16 on the front of the compartment is a strip of velvet or other similar material 34 and within this is a metal frame 35, having a series of apertures 36, which register with apertures 37 in the plate 14. There are nine of these apertures, there being three series of three each. On the back of the camera casing is a series of three apertures, one being indicated in Fig. 5 at 38, in front of which a shutter 39 slides. The notches 8 are so positioned that the latch 9 by engagement therewith either locates the focusing window in front of the middle window in the camera casing, or one of the series of three windows in the slidable back in registry with the three windows in the camera casing. As described in my companion applications, three lenses are simultaneously used and the operation of the shutter permits light from the three lenses to pass respectively through three color filters to the three exposure openings in the camera casing.

Adapted for use in the above described back is a plate holder 40, on the front of which are three series of three apertures 41 corresponding to the windows 37 in the front of the compartment. In order to secure accurate registry of the apertures 41 of the plate holder with the exposure windows 37, and in order to avoid any possibility of the plate holder being inserted with the wrong face in front, pins 42 are mounted in the frame 16, and sockets 43 are provided in the plate holder. When the plate holder is inserted, the door 25 cannot be closed unless the pins 42 are positioned in the socket 43, thus insuring the proper position and registry of the plate holder. There is in the back of the plate holder a large slide 44, indicated in dotted lines in Fig. 7, with a handle 45, by which it may be withdrawn to permit of the insertion into the plate holder of a sensitive plate considerably larger than the dimensions of the group of apertures 41. Another slide 46, with a handle 47 is positioned between the front of the holder and the plate within and withdrawn to permit exposure of the plate.

When the plate holder is positioned in the compartment of back 24, the handles 45 and 47 protrude through the opening 21 between the abutments 20 at the end of the compartment. Slide 46 is of a width to be drawn through this aperture, but slide 44 is wider than the aperture, and hence cannot be withdrawn by mistake, since the outer parts of its front edge 50 act as abutments engaging abutments 20. It is therefore impossible for the user to draw the wrong slide.

From the above description it is apparent that I have devised a coöperating plate holder and camera back so that the plate holder cannot be fitted into the back in the wrong way. If the plate holder is placed therein and the door closed, the user is assured that the exposure openings are properly registered, and the front of the holder in contact with the front of the compartment. When he withdraws one of the slides, he knows it is the proper one. As the camera is designed for use by the amateur, these features are of importance since they lessen, to that extent, the degree of attention to details and care in manipulation incidental to the taking of the picture.

In use, the operator will insert the plate holder in the compartment, and latch the door closed. He will then move the back to the focusing position and after focusing will move the back to the position to expose the first series of exposure areas. The exposure slide will be withdrawn and the shutter operated to make the exposure. The back may then be moved to the second position and a second exposure made, or the slide may be replaced and the camera refocused on another subject, the second exposure then being made through the second set of exposure windows. When three exposures have been made, the plate is developed and will contain three color records of three subjects.

While I have shown the parts of this embodiment of my invention with considerable detail, it is to be understood that I do not limit the scope of my invention to the particular structure shown and described but I consider as included therein all such mechanical equivalents as reasonably fall within the appended claims.

Having thus described my invention, what I claim as new and desire to secure by Letters Patent is:

1. The combination with a camera having a rear compartment, the front wall of which contains a plurality of exposure openings, of a plateholder having therein a plurality of exposure openings, there being on the camera and the plateholder coöperating means whereby the openings in both will be exactly registered when the plateholder is positioned in the compartment.

2. The combination with a camera having a rear compartment, the front wall of which contains a plurality of exposure openings, of a plateholder having therein a plurality of exposure openings, there being on the camera and the plateholder coöperating means whereby the openings in both will be exactly registered when the plateholder is positioned in the compartment, there being in the compartment means for pressing the front of the plateholder into contact with the front wall of the compartment.

3. The combination with a camera having a compartment for holding a plateholder in exposure position, there being at one end of said compartment an abutment across part thereof, leaving an opening, of a plateholder fitting said compartment and having two slides, one of which, when the plateholder is properly positioned in the compartment, is withdrawable through said opening, and the other of which is not withdrawable through said opening.

4. The combination with a camera having a rear compartment for holding a plateholder in exposure position, said compartment having at one end an opening and an abutment, of a plateholder fitting said compartment and having two slides, each having a handle which, when the holder is positioned in said camera, will protrude through said opening, one slide being so dimensioned that it may be withdrawn through the opening, and the other slide having an abutment adapted to engage the abutment at the end of the compartment whereby it may not be withdrawn when the holder is positioned within the compartment.

5. The combination with a camera having a rear compartment for supporting a plateholder in exposure position, of a plateholder adapted to fit within said compartment, cooperating means in the compartment and on the plateholder for insuring that the front side of the plateholder will face the front of the compartment and that the plateholder will be properly positioned therein, said compartment having at one end an opening and an abutment, and the holder having two slides one of which is so dimensioned as to pass through the opening and the other of which has an abutment engaging the first mentioned abutment to prevent the withdrawal of the slide, whereby the holder can be placed in only one position within the compartment and only one slide can be withdrawn when it is in position.

6. The combination with a camera having therein a compartment for holding a plateholder in exposure position, the front wall of said compartment having an exposure aperture and having studs, and one end of the compartment having flanges extending only partly thereacross leaving an end opening, and a rear door for said compartment, of a plateholder adapted to be inserted into said compartment through said door and having apertures registering with said lugs to insure the proper positioning of the holder in the compartment, and having two slides, one on the rear to permit the insertion of a plate in the holder and one on the front to permit exposure of the plate in the camera, both of said slides having protruding handles at one end, the handles, when the holder is in the compartment, extending through the end opening of the compartment, the rear slide being wider than the opening to prevent its withdrawal, and the front slide being no wider than the opening, so that it alone can be withdrawn when the holder is properly located in the compartment.

7. A camera having a rear compartment, the front of which has an exposure opening and carries registry studs, one end wall of the compartment having an opening, and a hinged door on the back of the compartment and carrying pressure springs, and latches for holding the door closed, the compartment being adapted to contain a plateholder and the springs functioning to press such a plateholder into contact with the front of the compartment.

Signed at Rochester, New York, this 29th day of April 1920.

J. TESSIER.